US012706350B2

(12) United States Patent
Cho et al.

(10) Patent No.: US 12,706,350 B2
(45) **Date of Patent: *Aug. 11, 2026**

(54) COMPOSITE SEPARATOR INCLUDING POROUS SUBSTRATE WITH POROUS LAYER INCLUDING POLYACRYLIC ACID METAL SALT BINDER AND INORGANIC PARTICLES, LITHIUM BATTERY INCLUDING THE SAME, AND METHOD OF PREPARING THE SAME

(71) Applicant: SAMSUNG SDI CO., LTD., Yongin-si (KR)

(72) Inventors: Minho Cho, Yongin-si (KR); Byungmin Lee, Yongin-si (KR); Kyoseon Koo, Yongin-si (KR); Esul Jung, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 231 days.

This patent is subject to a terminal disclaimer.

(21) Appl. No.: 18/400,115

(22) Filed: Dec. 29, 2023

(65) Prior Publication Data

US 2024/0136660 A1 Apr. 25, 2024
US 2024/0234951 A9 Jul. 11, 2024

Related U.S. Application Data

(63) Continuation of application No. 17/209,692, filed on Mar. 23, 2021, now Pat. No. 11,862,812.

(30) Foreign Application Priority Data

Mar. 24, 2020 (KR) ........................ 10-2020-0035811

(51) Int. Cl.
*H01M 50/446* (2021.01)
*H01M 10/0525* (2010.01)
(Continued)

(52) U.S. Cl.
CPC ..... *H01M 50/446* (2021.01); *H01M 10/0525* (2013.01); *H01M 50/403* (2021.01);
(Continued)

(58) Field of Classification Search
CPC ............. H01M 50/446; H01M 50/489; H01M 50/403; H01M 50/449; H01M 50/42; H01M 50/431
(Continued)

(56) References Cited

U.S. PATENT DOCUMENTS 9,180,412 B2 11/2015 Jo et al.
9,508,974 B2 11/2016 Lee et al.
(Continued)

FOREIGN PATENT DOCUMENTS

CN 105789523 A * 7/2016 ........ H01M 10/0525
CN 109103397 A * 12/2018 .......... H01M 50/431
(Continued)

OTHER PUBLICATIONS

Office action for corresponding KR Patent Application No. 10-2020-0035811, dated Jan. 19, 2023, 5pp.

*Primary Examiner* — Sean P Cullen
(74) *Attorney, Agent, or Firm* — Womble Bond Dickinson (US) LLP

(57) ABSTRACT

Provided are a composite separator, a lithium battery including the same, and a method of manufacturing the composite separator. The composite separator includes: a porous substrate; and a coating layer on at least one surface of the porous substrate, wherein the coating layer includes a water-soluble binder and inorganic particles, and the water-soluble binder includes a polyacrylic acid metal salt.

18 Claims, 2 Drawing Sheets

(51) Int. Cl.

| | |
|---|---|
| ***H01M 50/403*** | (2021.01) |
| ***H01M 50/42*** | (2021.01) |
| ***H01M 50/431*** | (2021.01) |
| ***H01M 50/449*** | (2021.01) |
| ***H01M 50/489*** | (2021.01) |

(52) U.S. Cl.
CPC ......... *H01M 50/42* (2021.01); *H01M 50/431* (2021.01); *H01M 50/449* (2021.01); *H01M 50/489* (2021.01)

(58) Field of Classification Search
USPC ......................................... 429/144, 251, 254
See application file for complete search history.

(56) References Cited

U.S. PATENT DOCUMENTS

| | | | | |
|---|---|---|---|---|
| 10,205,147 | B2 | 2/2019 | Park et al. | |
| 10,217,984 | B2 | 2/2019 | Saegusa et al. | |
| 10,333,124 | B2 | 6/2019 | Park et al. | |
| 10,608,225 | B2 | 3/2020 | Kim et al. | |
| 11,862,812 | B2 * | 1/2024 | Cho .................... | H01M 50/431 |
| 2010/0209774 | A1 | 8/2010 | Minami et al. | |
| 2015/0072214 | A1 | 3/2015 | Suzuki et al. | |
| 2015/0155538 | A1 | 6/2015 | Tang et al. | |
| 2016/0149186 | A1 | 5/2016 | Kim et al. | |
| 2019/0245182 | A1 | 8/2019 | Liao et al. | |
| 2020/0373579 | A1 * | 11/2020 | Lee ....................... | H01M 4/364 |
| 2020/0411826 | A1 | 12/2020 | Lee et al. | |

FOREIGN PATENT DOCUMENTS

| | | | | |
|---|---|---|---|---|
| JP | 2016-072150 | A | 5/2016 | |
| JP | 2016-072231 | A | 5/2016 | |
| JP | 2019-523518 | A | 8/2019 | |
| KR | 10-1117126 | B1 | 2/2012 | |
| KR | 10-1256968 | B1 | 4/2013 | |
| KR | 10-1288650 | B1 | 7/2013 | |
| KR | 10-2014-0091107 | A | 7/2014 | |
| KR | 10-2015-0004369 | A | 1/2015 | |
| KR | 10-1551757 | B1 | 9/2015 | |
| KR | 10-2016-0061202 | A | 5/2016 | |
| KR | 10-2016-0134046 | A | 11/2016 | |
| KR | 10-1989533 | B1 | 6/2019 | |
| WO | WO-2015046126 | A1 * | 4/2015 | .......... H01M 50/449 |

* cited by examiner

COMPOSITE SEPARATOR INCLUDING POROUS SUBSTRATE WITH POROUS LAYER INCLUDING POLYACRYLIC ACID METAL SALT BINDER AND INORGANIC PARTICLES, LITHIUM BATTERY INCLUDING THE SAME, AND METHOD OF PREPARING THE SAME

CROSS-REFERENCE TO RELATED APPLICATION

This application is a continuation of U.S. patent application Ser. No. 17/209,692, filed Mar. 23, 2021, which claims priority to and the benefit of Korean Patent Application No. 10-2020-0035811, filed on Mar. 24, 2020, in the Korean Intellectual Property Office, the entire content of which is hereby incorporated by reference.

BACKGROUND

1. Field

Embodiments of the present disclosure relate to a composite separator, a lithium battery including the same, and a method of preparing the composite separator.

2. Description of the Related Art

To meet the miniaturization and high performance characteristics of various devices, the miniaturization and light weight of lithium batteries have become important. In addition, the discharge capacity, energy density, and cyclic characteristics of lithium batteries have become important for use in electric vehicles.

To meet these applications, lithium batteries having high energy density per unit volume and enhanced stability are required or desired.

To provide a lithium battery having high energy density and enhanced stability, there is a need for a separator which is small in volume and of which shrinkage and deformation are suppressed or reduced at a high temperature.

When a coating layer including inorganic particles is placed on the porous substrate of a separator, thermal stability can be improved as compared with a separator made of a porous polymer.

The thermal stability of the separator may be further improved by increasing the thickness of the coating layer including the inorganic particles. However, because the thickness of the coating layer is increased, the volume of the separator and a lithium battery including the same is increased. Accordingly, the energy density of the lithium battery is decreased.

The coating layer including the inorganic particles may be easily separated from the porous substrate due to a low adhesion force with the porous substrate caused by shrinkage and deformation during charging and discharging.

Therefore, there is a need for a separator which overcomes the limitations of the related art, has enhanced thermal stability, increased adhesion force, and reduced volume.

SUMMARY

Provided are a composite separator with enhanced thermal stability, increased adhesion force, and reduced volume.

Provided is a lithium battery including the composite separator.

Provided is a method of preparing the composite separator.

Additional aspects of embodiments will be set forth in part in the description which follows and, in part, will be apparent from the description, or may be learned by practice of the presented embodiments of the disclosure.

According to an aspect of an embodiment, a composite separator includes:

a porous substrate; and a coating layer on at least one surface of the porous substrate, wherein the coating layer includes a water-soluble binder and inorganic particles, the water-soluble binder includes a polyacrylic acid metal salt, the polyacrylic acid metal salt has a weight average molecular weight of 300,000 Dalton (Da) or more, and the inorganic particles may have an average particle diameter (D50) of 500 nm or more.

According to an aspect of another embodiment, a lithium battery includes:

a positive electrode; a negative electrode; and a composite separator between the positive electrode and the negative electrode.

According to another aspect of embodiments of the present disclosure, a method of manufacturing a composite separator includes:

providing a porous substrate;

preparing a stacked structure by coating a composition including a water-soluble binder, inorganic particles, and water on one surface or opposite surfaces of the porous substrate; and drying the stacked structure to form a coating layer on at least one surface of the porous substrate, wherein the coating layer includes the water-soluble binder and the inorganic particles, and the water-soluble binder includes a polyacrylic acid metal salt, and the weight average molecular weight of the polyacrylic acid metal salt is 300,000 Daltons or more, and the average particle diameter (D50) of the inorganic particles is 500 nm or more.

BRIEF DESCRIPTION OF THE DRAWINGS

The above and other aspects and features of certain embodiments of the disclosure will be more apparent from the following description taken in conjunction with the accompanying drawings, in which.

DETAILED DESCRIPTION

Figure 1:
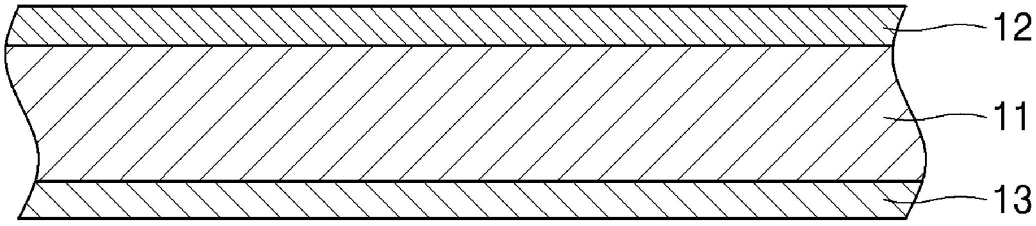
FIG. 1 is a schematic cross-sectional view of a composite separator according to an embodiment.

Reference will now be made in more detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of embodiments of the present description. As used herein, the term "and/or" includes any and all combinations of one or more of the associated listed items. Expressions such as "at least one of,"

when preceding a list of elements, modify the entire list of elements and do not modify the individual elements of the list.

The subject matter of the present disclosure described below may be subjected to various transformations and may have various embodiments, and certain embodiments are illustrated in the drawings and described in more detail in the detailed description. However, this is not intended to limit the present disclosure to a specific embodiment, and it should be understood that the present disclosure includes all changes, equivalents, and replacements that fall within the spirit and technical scope of the present disclosure.

The following terms are used only to describe specific embodiments, and are not intended to limit the present disclosure. The singular expression includes a plurality of expressions unless explicitly differently indicated in the context. Hereinafter, it should be understood that terms such as "include" or "have" are intended to indicate the presence of a feature, a number, a step, an operation, a constituting element, a part, a component, a material, or a combination thereof described in the specification, and do not preclude the presence or addition of one or more other features, numbers, steps, operations, constituting elements, parts, components, materials, or a combination thereof. Hereinafter, "/" may be interpreted as "and" or "or" according to circumstances.

In the drawings, in order to clearly represent several layers and regions, the thickness is enlarged or reduced. Like reference numerals refer to like elements throughout the specification. Throughout the specification, when it is assumed that a portion such as a layer, a film, an area, a plate, and the like is "on" or "above" another portion, the portion is not only directly above the other portion but also includes another portion therebetween. Throughout the specification, terms such as first and second may be used to describe various constituting elements, but constituting elements should not be limited by terms. The terms are only used to distinguish one constituting element from another.

Hereinafter, a composite separator according to example embodiments, a lithium battery including the composite separator, and a method of preparing the composite separator will be described in more detail.

A composite separator according to an embodiment includes: a porous substrate; and a coating layer on at least one surface of the porous substrate, wherein the coating layer includes a water-soluble binder and inorganic particles, the water-soluble binder includes a polyacrylic acid metal salt, and the polyacrylic acid metal salt has a weight average molecular weight of 300,000 Dalton (Da) or more, and the inorganic particles have an average particle diameter (D50) of 500 nm or more.

As the composite separator contains a polyacrylic acid metal salt having a weight average molecular weight of 300,000 Dalton or more and inorganic particles having an average particle diameter of 500 nm or more, the composite separator concurrently (e.g., simultaneously) provides enhanced thermal stability and adhesion force, and the amount of the residual moisture included therein may be decreased. In one or more embodiments, rapid contraction and/or deformation of the composite separator at a high temperature is suppressed or reduced, and the adhesion force between the coating layer and the porous substrate, which are included in the composite separator, is improved. Accordingly, the phenomenon in which the coating layer of the composite separator is easily detached from the porous substrate due to the repeated shrinkage/expansion of the electrode volume during the charging and discharging process of a lithium battery, can be suppressed or reduced. Regarding a lithium battery, volume expansion of the lithium battery due to separation of the coating layer, an increase in internal resistance of the lithium battery, and a short circuit of the lithium battery due to melting of a porous substrate at a high temperature may be prevented (or an occurrence of such a short circuit may be reduced). In addition, the thermal stability of the lithium battery including the composite separator may be improved, and the energy density of the lithium battery may be increased due to the suppression or reduction of the increase in volume of the lithium battery. In addition, because the amount of the residual moisture contained in the composite separator is reduced, and thus, side reactions in the charging/discharging process of the lithium battery including the composite separator are suppressed or reduced, the cyclic characteristics of the lithium battery may be improved and the decrease in discharge capacity may be suppressed or reduced.

The coating layer may include a binder, and the binder may include, for example, a polyacrylic acid metal salt having a weight average molecular weight of 300,000 Dalton or more.

The weight average molecular weight of the polyacrylic acid metal salt included in the composite separator may be, for example, from about 300,000 Dalton to about 500,000 Dalton, from about 300,000 Dalton to about 480,000 Dalton, from about 300,000 Dalton to about 450,000 Dalton, from about 300,000 Dalton to about 420,000 Dalton, from about 300,000 Dalton to about 400,000 Dalton, from about 300,000 Dalton to about 380,000 Dalton, from about 320,000 Dalton to about 380,000 Dalton, or from about 330,000 Dalton to about 370,000 Dalton. When the polyacrylic acid metal salt has an excessively low weight average molecular weight (e.g., is outside of the ranges described herein), the heat shrinkage rate of the composite separator may increase, and thus, the heat resistance of the composite separator may be decreased. When the weight average molecular weight of the polyacrylic acid metal salt is too high (e.g., is outside of the ranges described herein), it may be difficult to dissolve the polyacrylic acid metal salt in a solvent, and thus, it may be difficult to form a suitable coating layer. In the present specification, the weight average molecular weight of the binder included in the composite separator may be measured by, for example, gel permeation chromatography (GPC) with respect to a polystyrene standard sample.

The polyacrylic acid metal salt included in the composite separator is, for example, a polyacrylic acid lithium salt. The term "polyacrylic acid lithium salt," as used herein, refers to a form in which some or all hydrogen at an end group of an acrylic acid repeating unit (e.g., an acidic hydrogen of the acrylic acid group) included in a polyacrylic acid is substituted with lithium ions. The acrylic repeating unit substituted with lithium ions in the acrylic acid repeating unit including the polyacrylic acid metal salt has a mole ratio of greater than 0 and equal to or less than 1.0 (e.g., a mole ratio of the acrylic repeating unit substituted with lithium ions in the polyacrylic acid metal salt to the total number of repeating units (e.g., the sum of the acrylic repeating units substituted with lithium ions and the acrylic acid repeating units in the polyacrylic acid metal salt) is greater than 0 and equal to or less than 1.0). As the composite separator includes the polyacrylic acid metal salt, compared to the composite separator including polyacrylic acid in which lithium ions are not substituted, the heat shrinkage rate may be reduced and the adhesion force between the coating layer and the substrate may be increased. Therefore, the thermal stability of the lithium battery including the polyacrylic acid lithium salt may be enhanced and the deterioration in the charging and discharging process may be suppressed or reduced.

The acrylic repeating unit substituted with lithium ions in the acrylic repeating unit included in the polyacrylic acid metal salt (which may also be referred to herein as a polyacrylic acid lithium salt) may have a mole ratio of (e.g., a mole ratio of the acrylic repeating unit substituted with lithium ions in the polyacrylic acid metal salt to the total number of repeating units (e.g., the sum of the acrylic repeating units substituted with lithium ions and the acrylic acid repeating units in the polyacrylic acid metal salt) may be), for example, about 0.1 to about 0.9, about 0.2 to about 0.9, about 0.2 to about 0.8, or about 0.3 to about 0.8. In the present specification, a mole ratio of an acrylic repeating unit substituted with lithium ions in the acrylic repeating unit including a polyacrylic acid metal salt may be defined as, for example, a degree of substitution (DS). As the polyacrylic acid metal salt has such ranges of DS, the heat shrinkage rate of the composite separator may be further reduced, and the adhesion force between the coating layer and the substrate may be further enhanced.

For example, the coating layer may further include or may not include a binder other than the polyacrylic acid lithium salt described above. The binder additionally included in the coating layer may be, for example, a water-soluble or water-dispersible binder.

The binder additionally included in the coating layer may be, for example, polyacrylic acid, polyvinylidene fluoride, a polyvinylidene fluoride-hexafluoropropylene copolymer, a polyvinylidene fluoride-trichloroethylene copolymer, a polyvinylidene fluoride-chlorotrifluoroethylene copolymer, polymethylmethacrylate, polyacrylonitrile, polyvinylpyrrolidone, polyvinylacetate, an ethylene vinyl acetate copolymer, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, an acrylonitrile styrene butadiene copolymer, polyimide, polyvinylacetamide, polyacrylamide, polyester, polyvinylacetate, polyamide, polyimide, polyamideimide, polyetherimide, polyarylate, polysulfone, polyethersulfone, polymethylmethacrylate, polyacrylonitrile, polyvinylpyrrolidone, or a combination of two or more thereof.

The binder additionally included in the coating layer may be, for example, a fluorine-based binder. The fluorine-based binder may be a binder in which some or all hydrogen connected or coupled to carbon is substituted with fluorine. For example, the fluorine-based binder may be a polymer containing a repeating unit derived from one or more monomers selected from a vinylidine fluoride monomer, an ethylene tetrafluoride monomer, and a propylene hexafluoride monomer. The fluorine-based binder may be, for example, a fluorine-based and/or a fluorine-based copolymer.

The fluorine-based binder additionally included in the coating layer may be, for example, a copolymer of the ethylene tetrafluoride monomer and another monomer. The other monomer used together with the ethylene tetrafluoride monomer may be one or more fluorine-containing monomers selected from vinylidene fluoride, hexafluoropropylene, chlorotrifluoroethylene, and perfluoroalkylvinylether. The fluorine-based binder may be, for example, an ethylene tetrafluoride-vinylidene fluoride copolymer, an ethylene tetrafluoride-hexafluoropropylene copolymer, an ethylene tetrafluoride-chlorotrifluoroethylene copolymer, or an ethylene tetrafluoride-perfluoroalkylvinylether. The amount of the ethylene tetrafluoride monomer included in the fluorine-based binder may be, for example, 10 mol % or more, 30 mol % or more, 50 mol % or more, 70 mol % or more, or 90 mol % or more, based on, for example, the total moles of the coating layer or the total moles of the fluorine-based binder. In one or more embodiments, the fluorine-based binder may be, for example, a copolymer of a vinylidine fluoride monomer and another monomer. The fluorine-based binder may be, for example, a copolymer of a vinylidine fluoride monomer and one or more fluorine-containing monomer selected from hexafluoropropylene, chlorotrifluoroethylene, fluorovinyl, and perfluoroalkylvinylether. In more detail, the vinylidine-based monomer may be a vinylidene fluoride homopolymer, a vinylidene fluoride-hexafluoropropylene copolymer, a vinylidene fluoride-chlorotrifluoroethylene copolymer, and/or the like. The amount of the vinylidene fluoride-based monomer included in the fluorine-based binder may be, for example, 50 mol % or more, 60 mol % or more, 70 mol % or more, 80 mol % or more, or 90 mol % or more, based on, for example, the total moles of the coating layer or the total moles of the fluorine-based binder.

The fluorine-based binder additionally included in the coating layer may be, for example, polyvinylidene fluoride, a polyvinylidene fluoride-hexafluoropropylene copolymer, a polyvinylidene fluoride-trichloroethylene copolymer, a polyvinylidene fluoride-chlorotrifloroethylene copolymer, polytetrafluoroethylene, and/or the like. The fluorine-based binder additionally included in the coating layer may be, for example, a vinylidene fluoride-hexafluoropropylene copolymer. The vinylidene fluoride-hexafluoropropylene copolymer additionally included in the coating layer may have a glass transition temperature of −10° C. or less and a melting point of 150° C. or more. The glass transition temperature and/or the melting point of the binder or copolymer may be measured using, for example, differential scanning calorimetry (DSC) or differential thermal analysis (DTA).

A glass transition temperature of the vinylidene fluoride-hexafluoropropylene copolymer additionally included in the coating layer may be, for example, −10° C. or less, −15° C. or less, −20° C. or less, or −25° C. or less. The glass transition temperature of the vinylidene fluoride-hexafluoropropylene copolymer may be, for example, −80° C. or more, −60° C. or more, −50° C. or more, or −40° C. or more. The glass transition temperature of the vinylidene fluoride-hexafluoropropylene copolymer may be, for example, from about −80° C. to about −10° C., from about −60° C. to about −15° C., from about −50° C. to about −40° C., and from about −40° C. to about −25° C. When the glass transition temperature of the vinylidene fluoride-hexafluoropropylene copolymer is too low (e.g., is outside of the ranges described herein), crystallinity of the copolymer is lowered and thus, swelling with respect to an electrolytic solution is increased, resulting in a decrease in bending strength and/bonding strength. When the glass transition temperature of the vinylidene fluoride-hexafluoropropylene copolymer is too high (e.g., is outside of the ranges described herein), crystallinity of the copolymer is increased and thus, swelling with respect to an electrolytic solution is negligible, resulting in a decrease in bending strength and/bonding strength.

A melting point of the vinylidene fluoride-hexafluoropropylene copolymer additionally included in the coating layer may be, for example, 100° C. or more, 120° C. or more, 130° C. or more, or 140° C. or more. The melting point of the vinylidene fluoride-hexafluoropropylene copolymer may be, for example, 200° C. or less, 190° C. or less, 180° C. or less, or 170° C. or less. The melting point of the vinylidene fluoride-hexafluoropropylene copolymer may be, for example, from about 100° C. to about 200° C., from about 120° C. to about 190° C., from about 130° C. to about 180° C., or from about 140° C. to about 170° C. When the glass transition temperature of the vinylidene fluoride-hexafluoropropylene copolymer is too low (e.g., is outside of the ranges described herein), crystallinity of the copolymer is lowered and thus, swelling with respect to an electrolytic solution is increased, resulting in a decrease in bending strength and/bonding strength. When the glass transition temperature of the vinylidene fluoride-hexafluoropropylene copolymer is too high (e.g., is outside of the ranges described herein), crystallinity of the copolymer is increased and thus, swelling with respect to an electrolytic solution is negligible, resulting in a decrease in bending strength and/bonding strength.

The amount of hexafluoropropylene in the vinylidene fluoride-hexafluoropropylene copolymer additionally included in the coating layer may be, for example, 1 mol % or more, 3 mol % or more, or 5 mol % or more, based on, for example, the total moles of the coating layer or the total moles of the vinylidene fluoride-hexafluoropropylene copolymer. The amount of hexafluoropropylene contained in the vinylidene fluoride-hexafluoropropylene copolymer may be, for example, 20 mol % or less, 17 mol % or less, or 15 mol % or less, based on, for example, the total moles of the coating layer or the total moles of the vinylidene fluoride-hexafluoropropylene copolymer. The amount of hexafluoropropylene contained in the vinylidene fluoride-hexafluoropropylene copolymer may be, for example, from about 1 mol % to about 20 mol %, from about 3 mol % to about 17 mol %, or from about 5 mol % to about 15 mol %, based on, for example, the total moles of the coating layer or the total moles of the vinylidene fluoride-hexafluoropropylene copolymer. When the amount of hexafluoropropylene is too low (e.g., is outside of the ranges described herein), crystallinity of the copolymer is increased and swelling of the coating layer with respect to an electrolytic solution is negligible, resulting in a decrease in the bending strength and/bonding strength. The amount of hexafluoropropylene is excessively high (e.g., is outside of the ranges described herein), crystallinity of the copolymer is very high and swelling with respect to an electrolytic solution is excessively increased, resulting in a decrease in bending strength and/bonding strength.

The fluorine-based binder additionally included in the coating layer may include, for example, a hydrophilic group. The hydrophilic group additionally included in the fluorine-based binder included in the binder may be one or more selected from a carboxylic acid group, a sulfonic acid group, a phosphoric acid group, an acid anhydride group, a hydroxyl group, and a salt thereof, but is not limited thereto. The hydrophilic group may be any suitable hydrophilic functional group that is used in the art. The introduction of the hydrophilic group (e.g., a polar functional group) into the fluorine-based binder additionally included in the coating layer may be performed by, for example, adding, to the fluorine-containing monomer, a monomer including a carboxylic acid group, a sulfonic acid group, a phosphoric acid group, an acid anhydride group, a hydroxyl group, or a salt thereof, and polymerizing the resultant mixture.

Examples of the monomer having a carboxylic acid group include monocarboxylic acid and derivatives thereof, and dicarboxylic acid and derivatives thereof. Examples of the monocarboxylic acid include acrylic acid, methacrylic acid, crotonic acid, and the like. Examples of the monocarboxylic acid derivatives include 2-ethylacrylic acid, isocrotonic acid, α-acetoxyacrylic acid, β-trans-aryloxyacrylic acid, α-chloro-β-E-methoxy acrylic acid, and β-diaminoacrylic acid. Examples of dicarboxylic acids include maleic acid, fumaric acid, itaconic acid, and the like. Examples of dicarboxylic acid derivatives include: methylallyl maleic acid, such as methyl maleic acid, dimethyl maleic acid, phenyl maleic acid, chloro maleic acid, dichloro maleic acid, and fluoro maleic acid; and a maleic acid salt, such as diphenyl maleic acid, nonyl maleic acid, decyl maleic acid, dodecyl maleic acid, octadecyl maleic acid, and fluoroalkyl maleic acid. In addition, an acid anhydride producing a carboxyl group by hydrolysis may also be used. Examples of the acid anhydride of dicarboxylic acid include maleic acid anhydride, acrylic acid anhydride, maleic acid methyl anhydride, and maleic acid dimethyl anhydride. Also, examples of the dicarboxylic acid derivatives include monoesters and diesters of α, β-ethylenically unsaturated polycarboxylic acids such as monoethyl maleic acid, diethyl maleic acid, monobutyl maleic acid, dibutyl maleic acid, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate. Examples of the monomer having a sulfonic acid group include vinyl sulfonate, methylvinyl sulfonate, (meth)allyl sulfonate, styrene sulfonate, (meth)acrylic acid-2-ethyl sulfonate, 2-acrylamide-2-methylpropan sulfonate, 3-allyloxy-2-hydroxypropan sulfonate, and the like. Examples of the monomer having a phosphoric acid group include phosphate 2-(m eth)acryloyloxyethyl, methyl phosphate-2-(meth)acryloyloxyethyl, and ethyl phosphate-(meth)acryloyloxyethyl. Examples of the monomer having a hydroxyl group may include: an ethylenically unsaturated alcohol such as (meth)allyl alcohol, 3-butene-1-ol, 5-hexene-1-ol, and the like; alkanol esters of ethylenically unsaturated carboxylic acids such as acrylic acid-2-hydroxyethyl, acrylic acid-2-hydroxypropyl, methacrylic acid-2-hydroxyethyl, methacrylic acid-2-hydroxypropyl, maleic acid di2-hydroxyethyl, maleic acid di4-hydroxybutyl, and itaconic acid di2-hydroxypropyl; an ester of polyalkylene glycol represented by the general formula $CH_2{=}CR^1{-}COO{-}(C_nH_{2n}O)_m{-}H$ (m is an integer of 2 to 9, n is an integer of 2 to 4, and $R^1$ represents hydrogen or a methyl group) and (meth)acrylic acid; mono(meth)acrylic acid esters of dicarboxylic acids such as 2-hydroxyethyl-2'-(meth)acryloyloxyphthalate, 2-hydroxyethyl-2'-(meth)acryloyloxysuccinate; vinyl ethers such as 2-hydroxyethyl vinyl ether, 2-hydroxypropyl vinyl ether, and the like; a mono (meth)allyl ether of alkylene glycol, such as (meth)allyl-2-hydroxyethyl ether, (meth)allyl-2-hydroxypropyl ether, (meth)allyl-3-hydroxypropyl ether, (meth)allyl-2-hydroxy butyl ether, (meth)allyl-3-hydroxybutyl ether, (meth)allyl-4-hydroxybutyl ether, and (meth)allyl-6-hydroxyhexyl ether; polyoxyalkylene glycol (meth)monoallyl ether such as diethyleneglycol mono(meth)allyl ether, dipropyleneglycol mono(meth)allyl ether, and the like; a mono(meth)allyl ether of a halogen and hydroxy substituent of a (poly) alkylene glycol, such as glycerin mono(meth)allyl ether, (meth)allyl-2-chloro-3-hydroxypropyl ether, (meth)allyl-2-hydroxy-3-chloropropylether; mono(meth)allylethers of polyphenols, such as eugenol and isoeugenol, and halogen substituents thereof; and (meth)allyl thioethers of alkylene glycols such as (meth)allyl-2-hydroxyethyl thioether, (meth) allyl-2-hydroxypropyl thioether. Among them, the hydrophilic group may be a carboxylic acid group or a sulfonic acid group in that these hydrophilic groups have excellent adhesion force with an active material layer. For example, the carboxylic acid group may be used in that the transition metal ions eluted from the positive active material layer may be collected at high efficiency.

The vinylidene fluoride-hexafluoropropylene copolymer additionally included in the coating layer may include, for example, a hydrophilic group. Because the vinylidene fluoride-hexafluoropropylene copolymer contains a hydrophilic group, the vinylidene fluoride-hexafluoropropylene copolymer may be strongly bound by, for example, hydrogen bonding with the active material present on the electrode surface or the binder in an electrode. The hydrophilic group included in the vinylidene fluoride-hexafluoropropylene copolymer may be a hydroxyl group, a carboxyl group, a sulfone group, and/or a salt thereof. The hydrophilic group included in the vinylidene fluoride-hexafluoropropylene copolymer may be, for example, a carboxyl group (—COOH), a carboxylic acid ester group, and/or the like. For example, in the preparation of the vinylidene fluoride-hexafluoropropylene copolymer, copolymerizing may be performed with a monomer having a hydrophilic group, such as maleic anhydride, maleic acid, maleic acid ester, maleic acid monomethyl ester, and/or the like, to introduce a hydrophilic group into a main chain or to introduce a hydrophilic group into a side chain by grafting. The amount of the hydrophilic group may be measured by Fourier transform infrared spectroscopy (FT-IR), nuclear magnetic resonance spectroscopy (NMR), titration, etc. For example, in the case of a carboxylic acid group, the amount of a hydrophilic group may be obtained from an absorption intensity ratio of a C—H expansion vibration and a C═O expansion vibration of a carboxyl group based on a homopolymer by using FT-IR. The amount of the hydrophilic group included in the vinylidene fluoride-hexafluoropropylene copolymer may be, for example, 0.1 mol % or more, 0.2 mol % or more, or 0.3 mol % or more, based on, for example, the total moles of the coating layer or the total moles of the vinylidene fluoride-hexafluoropropylene copolymer. The amount of hydrophilic groups included in the vinylidene fluoride-hexafluoropropylene copolymer may be, for example, 5 mol % or less, 3 mol % or less, or 1 mol % or less, based on, for example, the total moles of the coating layer or the total moles of the vinylidene fluoride-hexafluoropropylene copolymer. The amount of the hydrophilic group included in the vinylidene fluoride-hexafluoropropylene copolymer may be, for example, from about 0.1 mol % to about 3 mol %, from about 0.2 mol % to about 2 mol %, or from about 0.3 mol % to about 1 mol %, based on, for example, the total moles of the coating layer or the total moles of the vinylidene fluoride-hexafluoropropylene copolymer. When the amount of the hydrophilic group is too low (e.g., is outside of the ranges described herein), crystallinity of the copolymer is increased, and thus, swelling with respect to the electrolytic solution is negligible, resulting in a decrease in bending strength and/bonding strength. When the amount of the hydrophilic group is excessively high (e.g., is outside of the ranges recited herein), crystallinity of the copolymer is very high and swelling with respect to the electrolytic solution is excessively increased, resulting in a decrease in bending strength and/bonding strength.

The weight average molecular weight of the vinylidene fluoride-hexafluoropropylene copolymer additionally included in the coating layer may be, for example, from about 500,000 Dalton to about 1.2 million Dalton, from about 700,000 Dalton to about 1.2 million Dalton, from about 750,000 Dalton to about 1.15 million Dalton, or from about 800,000 Dalton to about 1 million Dalton. Because the vinylidene fluoride-hexafluoropropylene copolymer has a weight average molecular weight in any of the above ranges, a time for dissolving the vinylidene fluoride-hexafluoropropylene copolymer in a solvent is reduced, and thus production efficiency is increased. In addition, because the vinylidene fluoride-hexafluoropropylene copolymer has a weight average molecular weight in any of the ranges above, a certain level of gel strength may be maintained after the swelling of the vinylidene fluoride-hexafluoropropylene copolymer with respect to an electrolytic solution, and bending strength and/bonding strength may be increased. In one or more embodiments of the present specification, the weight average molecular weight is a polystyrene conversion value obtained by gel permeation chromatography.

The coating layer includes inorganic particles. Because the coating layer includes the inorganic particles, the possibility of a short circuit between the positive electrode and the negative electrode is reduced, thereby enhancing the stability of the lithium battery.

The inorganic particles including the coating layer may have an average particle diameter (D50) of, for example, from about 500 nm to less than about 1000 nm, from about 500 nm to about 950 nm, from about 550 nm to about 950 nm, from about 600 nm to about 950 nm, from about 600 nm to about 900 nm, from about 600 nm to about 850 nm, or from about 600 nm to about 800 nm. When the average particle diameter of the inorganic particles included in the coating layer is excessively reduced (e.g., is outside of the ranges described herein), the amount of the residual moisture included in the composite separator may be excessively increased. Therefore, a side reaction of the lithium battery including the composite separator is increased, thereby degrading cyclic characteristics of the lithium battery and reducing discharge capacity. When the average particle diameter of the inorganic particles included in the coating layer is excessively increased (e.g., is outside of the ranges described herein), the thickness of the coating layer is increased, and thus, the volume of the composite separator including the coating layer and the lithium battery is increased. As a result, energy density per unit volume of the lithium battery may be reduced. The average particle diameter of the inorganic particles may be measured by using, for example, a laser diffraction method and/or a dynamic light scattering method. The average particle diameter of the inorganic particles may be measured by using, for example, a laser scattering particle size distribution system (for example, LA-920, Horiba Co., Ltd.). As used herein, the term "average particle diameter" may refer to a median particle diameter (D50) when 50 vol % (volume percentage) of the inorganic particles are accumulated from the small particle side in terms of the volume.

The inorganic particles included in the coating layer may be a metal oxide, a metalloid oxide, or a combination thereof. For example, the inorganic particles may include alumina, titania, boehmite, barium sulfate, calcium carbonate, calcium phosphate, amorphous silica, crystalline glass particles, kaolin, talc, silica-alumina composite oxide particles, calcium fluoride, lithium fluoride, zeolite, molybdenum sulfide, mica, magnesium oxide, and/or the like. The inorganic particles may include, for example, $TiO_2$, $SnO_2$, CaO, ZnO, $ZrO_2$, $CeO_2$, NiO, MgO, $Al_2O_3$, $SiO_2$, $Y_2O_3$, $SrTiO_3$, $BaTiO_3$, $MgF_2$, $Mg(OH)_2$, barium sulfate, boehmite, or a combination thereof. In consideration of compatibility with polyacrylic acid lithium salt, economic feasibility, and/or the like, the inorganic particles may include alumina, titania, boehmite, barium sulfate, or a combination thereof.

The inorganic particles included in the coating layer may be a sphere, a plate, and/or a fiber, but the inorganic particles are not limited thereto. The plate-shaped inorganic particles may be, for example, alumina, boehmite, and/or the like. In this case, reduction in the area of the separator at a high temperature may be further suppressed or reduced, relatively high porosity of the coating layer may be secured, and penetration evaluation characteristics of the lithium battery may be improved. When the inorganic particles are plate-shaped and/or fibrous, the aspect ratio of the inorganic particles may be from about 1:5 to about 1:100, from about 1:10 to about 1:100, from about 1:5 to about 1:50, or from about 1:10 to about 1:50. Regarding the flat surface of the plate-shaped inorganic particles, a length ratio of a long axis to a short axis may be from 1 to 3, from 1 to 2, or about 1. The aspect ratio and the length ratio of the long axis to the short axis may be measured by a scanning electron microscope (SEM). Within this aspect ratio and these length ranges of the short axis with respect to long axis, shrinkage of the separator may be suppressed or reduced, and the coating layer may secure relatively improved porosity, and penetration characteristics of the lithium battery may be improved. When the inorganic particles are plate-shaped, the average angle of the flat surface of the inorganic particles with respect to one surface of the porous substrate may be from 0 degrees to 30 degrees. For example, the angle of the flat surface of the inorganic particle with respect to one surface of the porous substrate may be converged to 0°. In one or more embodiments, one surface of the porous substrate may be parallel (e.g., substantially parallel) to a flat surface of the inorganic particles. For example, when the average angle of the flat surface of the inorganic compound with respect to one surface of the porous substrate is within these ranges, the heat shrinkage of the porous substrate may be effectively prevented or reduced, and thus, a separator having reduced shrinkage rate may be provided.

The coating layer may further include organic particles. The organic particle additionally included in the coating layer may be a cross-linked polymer. The organic particles additionally included in the coating layer may be a highly cross-linked polymer of which glass transition temperature (Tg) does not appear (e.g., which does not have a glass transition temperature (Tg) or does not have any glass transition). When a highly cross-linked polymer is used, heat resistance is improved, and thus shrinkage of the porous substrate may be effectively suppressed or reduced at a high temperature. The organic particles may include, for example, a styrene-based compound and/or a derivative thereof, a methyl methacrylate-based compound and/or a derivative thereof, an acrylate-based compound and/or a derivative thereof, a diallyl phthalate-based compound and/or a derivative thereof, a polyimide-based compound and/or a derivative thereof, a polyurethane-based compound and/or a derivative thereof, a copolymer thereof, and/or a combination thereof, but is not limited thereto. The organic particles may be any suitable material that can be used as organic particles in the art. For example, the organic particles may be cross-linked polystyrene particles and/or cross-linked polymethylmethacrylate particles. Any of the particles described herein may be secondary particles formed by aggregating primary particles. In a composite separator including the secondary particles, the porosity of the coating layer is increased, thereby providing a lithium battery having excellent high output characteristics.

The amount of the binder included in the coating layer may be, for example, from about 0.5 parts by weight to about 30 parts by weight, from about 1 part by weight to about 25 parts by weight, from about 1 to about 20 parts by weight, from about 1 part by weight to about 15 parts by weight, from about 1 to about 10 parts by weight, or from about 1 part by weight to about 5 parts by weight of the water-soluble binder based on 100 parts by weight of the inorganic particles. When the amount of the binder included in the coating layer is too low (e.g., is outside of the ranges described herein), an adhesion force between the coating layer and the porous substrate is decreased, and thus, the coating layer is easily separated from the porous substrate, and the inorganic particles may be separated from the coating layer. When the amount of the binder included in the coating layer is excessively high (e.g., is outside of the ranges described herein), the amount of the inorganic particles is relatively reduced, and thus, the effect of enhancing the thermal stability of the lithium battery including the polyacrylic acid lithium salt may be deteriorated or reduced.

The coating layer may further include a wetting agent. A weight average molecular weight of the wetting agent additionally included in the coating layer may be, for example, from about 250 Dalton to about 30,000 Dalton, from about 300 Dalton to about 30,000 Dalton, from about 400 Dalton to about 30,000 Dalton, from about 500 Dalton to about 30,000 Dalton, from about 700 Dalton to about 30,000 Dalton, from about 1000 Dalton to about 30,000 Dalton, from about 5, 000 Dalton to about 30,000 Dalton, from about 10,000 Dalton to about 30,000 Dalton, from about 15, 000 Dalton to about 30,000 Dalton, from about 20,000 Dalton to about 30,000 Dalton, or from about 20,000 Dalton to about 25, 000 Dalton.

The wetting agent included the coating layer may be, for example, one or more selected from polyvinyl alcohol, polyethylene glycol, sodium dodecyl sulfate, sodium dibutylnaphthalenesulfonate, polyacrylamide, polyethylene glycol fatty acid ester, alkyl polyoxyethylene ether carboxylate, alkyl phenol polyoxyethylene ether, sodium alkylbenzenesulfonate, alkyl phenol polyoxyethylene ether, polyoxyethylene alkyl amine, and polyoxyethylene amide, but is not limited thereto. For example, the wetting agent may be any suitable wetting agent that is used in the art.

The coating layer included in the composite separator may be on opposite surfaces of the porous substrate. Because the coating layer is on opposite sides of the porous substrate, the adhesion force between the coating layer and the porous substrate is further enhanced, and as a result, the volume change of the composite separator during charging and discharging of the lithium battery may be suppressed. For example, referring to FIG. 1, coating layers 12 and 13 each including a binder and inorganic particles are on opposite surfaces of a porous substrate 11 in the composite separator.

The total thickness of a coating layer included in the composite separator may be, for example, 25% or less, 24% or less, 23% or less, 22% or less, 21% or less, or 20% or less of the total thickness of the composite separator. The total thickness of a coating layer included in the composite separator may be, for example, from about 5% to about 25%, from about 8% to about 24%, from about 10% to about 23%, from about 10% to about 22%, from about 10% to about 21%, or from about 10% to about 20% of the total thickness of the composite separator. The total thickness of a coating layer may be, for example, the sum of a thickness of a first coating layer on one surface of the porous substrate and a thickness of a second coating layer on another surface of the porous substrate. Because the coating layer has such a thickness in ranges described herein, the composite separator may provide excellent thermal stability and adhesion force while an increase in the volume of the composite separator is suppressed or reduced.

The thickness of the porous substrate including the composite separator may be, for example, from about 1 μm to about 10 μm, from about 3 μm to about 10 μm, from about 5 μm to about 10 μm, from about 7 μm to about 10 μm, or from about 7 μm to about 9 μm. When the porous substrate is too thin, it may be difficult to maintain mechanical properties of the composite separator. For example, the composite separator may be easily torn and/or may have a pin-hole. When the porous substrate is excessively thick, energy density of the lithium battery may be reduced and discharge capacity may be reduced.

A thickness of the coating layer on one surface of the porous substrate included in the composite separator may be, for example, 1.2 μm or less, 1.1 μm or less, or 1.0 μm or less. The thickness of the coating layer on one side of the porous substrate may be, for example, from about 0.5 μm to about 1.2 μm, from about 0.6 μm to about 1.2 μm, from about 0.7 μm to about 1.2 μm, or from about 0.8 μm to about 1.2 μm, from about 0.8 μm to about 1.1 μm, or from about 0.8 μm to about 1.0 μm. When the coating layer on one surface of the porous substrate is excessively thin (e.g., is outside of the ranges described herein), heat resistance of the composite separator may be relatively low. When the coating layer on one surface of the porous substrate is excessively thick (e.g., is outside of the ranges described herein), energy density per unit volume of a lithium battery including a composite separator may be reduced and discharge capacity may be reduced, although heat resistance thereof may be increased.

When the coating layer is coated on opposite surfaces of the porous substrate included in the composite separator, the total thickness of the coating layer included in the composite separator may be, for example, about two times the thickness of the coating layer on one surface of the porous substrate.

The total thickness of the coating layer on opposite sides of the porous substrate included in the composite separator may be, for example, 2.4 μm or less, 2.2 μm or less, or 2.0 μm or less. The total thickness of the coating layer on opposite sides of the porous substrate may be, for example, from about 1.0 μm to about 2.4 μm, from about 1.2 μm to about 2.4 μm, from about 1.4 μm to about 2.4 μm, or from about 1.6 μm to about 2.4 μm, from about 1.6 μm to about 2.2 μm, or from about 1.6 μm to about 2.0 μm. When the total thickness of the coating layer on opposite sides of the porous substrate is excessively thin (e.g., is outside of the ranges described herein), the heat resistance of the composite separator may deteriorate. When the total thickness of the coating layer on opposite surfaces of the porous substrate is excessively thick (e.g., is outside of the ranges described herein), energy density per unit volume of a lithium battery including a composite separator may be reduced and discharge capacity may be reduced, although heat resistance thereof may be increased.

The total thickness of the composite separator may be, for example, 10.5 μm or less, 10.4 μm or less, 10.3 μm or less, 10.2 μm or less, 10.1 μm or less, or 10 μm or less. The total thickness of the composite separator may be, for example, from about 5 μm to 10.5 μm, from about 5 μm to about 10.4 μm, from about 5 μm to about 10.3 μm, from about 5 μm to about 10.2 μm, from about 55 μm to about 10.1 μm, or from about 5 μm to about 10 μm. When the total thickness of the composite separator is within any of these ranges, energy density per unit volume of a lithium battery including the composite separator such a small thickness may be increased. Also, when the total thickness of the composite separator is within any of these ranges, the composite separator may provide improved thermal stability and adhesion force.

The porous substrate included in the composite separator may have a pore size of, for example, from about 0.01 μm to about 2 μm, from about 0.01 μm to about 1 μm, or from about 0.05 μm to about 1 μm. When the pore size of the porous substrate is too small (e.g., is outside of the ranges described herein), lithium ions may not easily penetrate therethrough, and thus internal resistance of the lithium battery may be increased and cyclic characteristics of the lithium battery may deteriorate. When the pore size of the porous substrate is excessively big (e.g., is outside of the ranges described herein), dendrite(s) may easily grow through the pores. Therefore, due to the growth of the dendrite(s) through the porous substrate, the possibility of a short circuit between the positive electrode and the negative electrode may be increased.

The porosity of the porous substrate included in the composite separator may be, for example, from about 5% to about 95%, from about 10% to about 90%, from about 10% to about 80%, from about 20% to about 80%, from about 20% to about 70%, from about 30% to about 70%, or from about 40% to about 70%. When the porosity of the porous substrate is too small (e.g., is outside of the ranges described herein), lithium ions may not easily penetrate therethrough, and thus, internal resistance of the lithium battery may be increased and cyclic characteristics of the lithium battery may deteriorate. When the porosity of the porous substrate is too high (e.g., is outside of the ranges described herein), the mechanical strength of the composite separator may be decreased. The porosity of the porous substrate is a volume occupied by pores in the total volume of the porous substrate. The porosity of the porous substrate can be measured by a nitrogen adsorption method. In one or more embodiments, the porosity of the porous substrate can be calculated by measuring volume and weight of the porous substrate and a theoretical density of the polyolefin resin.

The porous substrate included in the composite separator may be a porous film including polyolefin. The polyolefin may have an excellent short-circuit prevention or reduction effect, and may enhance battery stability due to a shut-down effect. For example, the porous substrate may be a porous film formed of a resin such as a polyolefin such as polyethylene, polypropylene, polybutene, polyvinyl chloride, or a mixture or a copolymer thereof, but is not limited thereto. The film may be any suitable porous film that is used in the art. For example, the porous substrate may be a porous film formed of a polyolefin-based resin; a porous film in which polyolefin-based fibers are woven; non-woven fabric including polyolefin; or an aggregate of insulating material particles. For example, in the case of the porous membrane including polyolefin, a binder solution for preparing a porous layer to be formed on a porous substrate has excellent coatability, and the thickness of a composite separator is reduced, and thus, a ratio of an active material in a battery is increased, resulting in an increase in a capacity per unit volume.

The porous substrate included in the composite separator may include one or more selected from polyethylene, polypropylene terephthalate, polyethylene terephthalate, polybutylene terephthalate, polyester, polyacetal, polyamide, polycarbonate, polyimide, polyether ether ketone, polyethersulfone, polyphenylene oxide, polyphenylene sulfide, and polyethylene naphthalate.

The polyolefin used as a material for the porous substrate may be, for example, a homopolymer, copolymer, or mixture thereof of polyethylene, polypropylene, and/or the like. The polyethylene may be low density, medium density, or high density polyethylene, and in terms of mechanical strength, high-density polyethylene may be used. In addition, two or more kinds of polyethylene may be mixed to provide flexibility. The polymerization catalyst used for the preparation of polyethylene is not particularly limited, and may be a Ziegler-Natta catalyst, a Phillips catalyst, or a metallocene catalyst. In terms of both mechanical strength and high permeability, the weight average molecular weight of polyethylene may be from about 100,000 to about 12 million Dalton, for example, about 200,000 to about 3 million Dalton. The polypropylene may be a homopolymer, a random copolymer, or a block copolymer, and may be used alone or in a mixture of two or more thereof. In addition, the polymerization catalyst is not particularly limited, and may be a Ziegler-Natta catalyst or a metallocene catalyst. In addition, steric regularity is not particularly limited, and isotactic, syndiotactic, or atactic polypropylene may be used. In an embodiment, inexpensive isotactic polypropylene may be used. In addition, as long as the effects of the present disclosure are not damaged or reduced, additives such as polyolefins other than polyethylene or polypropylene and antioxidants may be added to the polyolefin.

The porous substrate included in the composite separator may include, for example, a polyolefin such as polyethylene, polypropylene, and/or the like, and may be a multi-layered film of two or more layers, and may be a mixed multi-layered film such as a polyethylene/polypropylene double-layer separator, a polyethylene/polypropylene/polyethylene triple-layer separator, a polypropylene/polyethylene/polypropylene triple-layer separator, or the like, but is not limited thereto. The material or configuration for the porous substrate may be any suitable material or configuration that is used for a porous substrate in the art. The porous substrate included in the composite separator may include, for example, a diene-based polymer prepared by polymerizing a monomer composition including a diene-based monomer. The diene-based monomer may be a conjugated diene-based monomer or a non-conjugated diene-based monomer. For example, the diene-based monomer may include one or more selected from 1, 3-butadiene, isoprene, 2-chloro-1, 3-butadiene, 2, 3-dimethyl-1, 3-butadiene, 2-ethyl-1, 3-butadiene, 1, 3-pentadiene, chloroprene, vinylpyridine, vinylnorbornene, dicyclopentadiene, and 1, 4-hexadiene, but is not limited thereto. The diene-based monomer may be any suitable material that can be used as a diene-based monomer in the art.

The composite separator may have a machine direction (MD) shrinkage rate (e.g., a machine direction heat shrinkage rate) and transverse direction (TD) shrinkage rate (e.g., a transverse direction heat shrinkage rate), each being 3% or less, 2.5% or less, or 2% or less, when treated at 150° C. for 1 hour. The composite separator may have a machine direction (MD) shrinkage rate (e.g., a machine direction heat shrinkage rate) and a transverse direction (TD) shrinkage rate (e.g., a transverse direction heat shrinkage rate), each being from about 0.01% to about 3%, from about 0.01% to about 2.5%, or from about 0.01% to about 2%. Because the composite separator has such a low heat shrinkage rate, deformation and shrinkage of the composite separator may be suppressed or reduced during high-temperature charging and discharging. As a result, thermal stability of a lithium battery including the composite separator may be enhanced.

The coating layer included in the composite separator may have a peel strength of 10 gf/mm or more, 12 gf/mm or more, 14 gf/mm or more, 16 gf/mm or more, or 18 gf/mm or more, with respect to the porous substrate. The coating layer included in the composite separator may have a peel strength of about 10 gf/mm to about 30 gf/mm, about 12 gf/mm to about 28 gf/mm, about 14 gf/mm to about 26 gf/mm, about 16 gf/mm to about 24 gf/mm, or about 18 gf/mm to about 22 gf/mm, with respect to the porous substrate. When the peel strength between the coating layer and the porous substrate is too low (e.g., is outside of the ranges described herein), the adhesion force between the coating layer and the porous substrate is reduced. Accordingly, the coating layer of the composite separator may be easily detached from the porous substrate due to the repeated shrinkage/expansion of the electrode volume during the charging and discharging process of a lithium battery. As a result, regarding a lithium battery, volume expansion of the lithium battery due to separation of the coating layer, an increase in internal resistance of the lithium battery, and a short circuit of the lithium battery due to melting of a porous substrate at a high temperature may occur. When the adhesion force between the coating layer and the porous substrate is excessively increased (e.g., is outside of the ranges described herein), the coating layer becomes too hard and the flexibility of the coating layer is decreased, resulting in cracks.

The composite separator may have a moisture content of 990 ppm or less, 900 ppm or less, 850 ppm or less, 800 ppm or less, 750 ppm or less, 700 ppm or less, 650 ppm or less, or 600 ppm or less, when treated at a temperature of 85° C. for 12 hours. The composite separator may have a moisture content from about 1 ppm. to about 990 ppm, from about 10 ppm to about 900 ppm, from about 50 ppm to about 850 ppm, from about 100 ppm to about 800 ppm, from about 100 ppm to about 750 ppm, from about 100 ppm to about 700 ppm, from about 100 ppm to about 650 ppm, or from about 100 ppm to about 600 ppm, when treated at 85° C. for 12 hours. When the residual moisture content of the composite separator is excessively increased (e.g., is outside of the ranges described herein), a side reaction of the lithium battery including the composite separator is increased, thereby degrading cyclic characteristics of the lithium battery and reducing discharge capacity thereof.

A lithium battery according to an embodiment includes an electrode assembly including a positive electrode, a negative electrode, and the composite separator between the positive electrode and the negative electrode. Due to the inclusion of the composite separator, the lithium battery may have increased thermal stability, and an increase in volume thereof is suppressed or reduced, resulting in an increase in the energy density of the lithium battery. In addition, because the amount of the residual moisture contained in the composite separator is reduced and side reactions in the charging/discharging process of the lithium battery including the composite separator are suppressed or reduced, the cyclic characteristics of the lithium battery may be improved and the decrease in discharge capacity may be suppressed or reduced.

The lithium battery may be manufactured by, for example, the following method.

First, a negative active material composition, in which a negative active material, a conductive material (e.g., an electrically conductive material), a binder, and a solvent are mixed, is prepared. The negative active material composition is coated directly on a metal current collector to manufacture a negative electrode plate. In another embodiment, the negative active material composition may be cast on a separate support, and a film exfoliated from the support may then be stacked on the metal current collector to prepare a negative electrode plate (e.g., to form a stacked structured). Types or kinds of the negative electrode are not limited to those listed above, and the negative electrode may be formed to have a variety of suitable types or kinds other than the above-described types or kinds.

The negative active material may be a non-carbon-based material. For example, the negative active material may include one or more selected from a metal that is alloyable with lithium, an alloy of a metal that is alloyable with lithium, and an oxide of a metal that is alloyable with lithium.

For example, the metal that is alloyable with lithium may include Si, Sn, Al, Ge, Pb, Bi, Sb, Si—Y alloy (Y is an alkali metal, an alkaline-earth metal, a Group 13 to 16 element, a transition element, a rare earth element, or a combination element thereof, and is not Si), a Sn—Y alloy (Y is an alkali metal, an alkaline-earth metal, a Group 13 to 16 element, a transition element, a rare earth element, or a combination element thereof, and is not Sn), and/or the like. The element Y may be Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof.

For example, the transition metal oxide may include lithium titanium oxide, vanadium oxide, lithium vanadium oxide, and/or the like.

For example, the non-transition metal oxide may include $SnO_2$ and/or SiOx ($0<x<2$).

In an embodiment, the negative active material may include one or more selected from the group consisting of Si, Sn, Pb, Ge, Al, SiOx($0<x\leq2$), SnOy($0<y\leq2$), $Li_4Ti_5O_{12}$, $TiO_2$, $LiTiO_3$, and $Li_2Ti_3O_7$, but is not limited thereto. The negative active material may be any suitable material that is used as a non-carbon based negative active material in the art.

In addition, a composite of the non-carbon based negative active material and the carbon-based material may be used, and the composite may further include a carbon-based negative active material in addition to the non-carbon-based material.

The carbon-based material may include crystalline carbon, amorphous carbon, or a mixture thereof. The crystalline carbon may include a non-shaped, plate-shaped, flake-shaped, spherical and/or fiber-shaped natural graphite and/or artificial graphite, and the amorphous carbon may be soft carbon (low temperature calcined carbon), hard carbon, mesophase pitch carbide, and/or calcined coke.

Examples of the conductive material may include metal powder and/or metal fiber of acetylene black, natural graphite, artificial graphite, carbon black (e.g., KETJEN™ black), acetylene black, a carbon fiber, copper, nickel, aluminum, silver, and the like; and a combination of one or more conductive materials such as polyphenylene derivatives, but the conductive material is not limited thereto. The conductive material may be any suitable material that can be used as a conductive material in the art. Also, the crystalline carbon-based material may be added as a conductive material (e.g., an electrically conductive material).

Examples of the binder include a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer, but embodiments are not limited thereto. Any suitable material available as a binding agent in the art may be used as the binder.

Examples of the solvent include N-methylpyrrolidone, acetone, and water, but are not limited thereto. Any suitable material that is available in the art as a solvent may be used.

Amounts of the negative active material, the conductive material, the binder, and the solvent may be in the ranges generally used in the manufacture of a lithium battery in the art. One or more of the conductive material, the binder, and the solvent may be omitted according to the use and configuration of the lithium battery.

In one or more embodiments, the binder used for the negative electrode may be the same as a binder included in the coating layer of the separator.

First, a positive active material composition, in which a positive active material, a conductive material (e.g., an electrically conductive material), a binder, and a solvent are mixed, is prepared. The positive active material composition is directly coated on a metal current collector and dried to prepare a positive electrode plate. In another embodiment, a positive electrode plate may be prepared by casting the positive active material composition on a separate support, and then laminating a film exfoliated from the support on the metal current collector.

The positive active material may include one or more selected from lithium cobalt oxide, lithium nickel cobalt manganese oxide, lithium nickel cobalt aluminum oxide, lithium iron phosphorous oxide, and lithium manganese oxide, but is not limited thereto. Any suitable material that is used as a positive active material in the art, may be used.

For example, the positive active material may include a compound represented by $Li_aA_{1-b}B_bD_2$ (where $0.90\leq a\leq1.8$, and $0\leq b\leq0.5$); $Li_aE_{1-b}B_bO_{2-c}D_c$ (where $0.90\leq a\leq1.8$, $0\leq b\leq0.5$, and $0\leq c\leq0.05$); $LiE_{2-b}B_bO_{4-c}D_c$ (where $0\leq b\leq0.5$, and $0\leq c\leq0.05$); $Li_aNi_{1-b-c}Co_bB_cD_\alpha$ (where $0.90\leq a\leq1.8$, $0\leq b\leq0.5$, $0\leq c\leq0.05$, and $0<\alpha\leq2$); $Li_aNi_{1-b-c}Co_bB_cO_{2-\alpha}F_\alpha$ (where $0.90\leq a\leq1.8$, $0\leq b\leq0.5$, $0\leq c\leq0.05$, and $0<\alpha<2$); $Li_aNi_{1-b-c}Co_bB_cO_{2-\alpha}F_2$ (where $0.90\leq a\leq1.8$, $0\leq b\leq0.5$, $0\leq c\leq0.05$, and $0<\alpha<2$); $Li_aNi_{1-b-c}Mn_bB_cD_\alpha$ (where $0.90\leq a\leq1.8$, $0\leq b\leq0.5$, $0\leq c\leq0.05$, and $0<\alpha\leq2$); $Li_aNi_{1-b-c}Mn_bB_cO_{2-\alpha}F_\alpha$ (where $0.90\leq a\leq1.8$, $0\leq b\leq0.5$, $0\leq c\leq0.05$, and $0<\alpha<2$); $Li_aNi_{1-b-c}Mn_bB_cO_{2-\alpha}F_2$ (where $0.90\leq a\leq1.8$, $0\leq b\leq0.5$, $0\leq c\leq0.05$, and $0<\alpha<2$); $Li_aNi_bE_cG_dO_2$ (where $0.90\leq a\leq1.8$, $0\leq b\leq0.9$, $0\leq c\leq0.5$, and $0.001\leq d\leq0.1$); $Li_aNi_bCo_cMn_dG_eO_2$ (where $0.90\leq a\leq1.8$, $0\leq b\leq0.9$, $0\leq c\leq0.5$, $0\leq d\leq0.5$, and $0.001\leq e\leq0.1$); $Li_aNiG_bO_2$ (where $0.90\leq a\leq1.8$, and $0.001\leq b\leq0.1$); $Li_aCoG_bO_2$ (where $0.90\leq a\leq1.8$, and $0.001\leq b\leq0.1$); $Li_aMnG_bO_2$ (where $0.90\leq a\leq1.8$, and $0.001\leq b\leq0.1$); $Li_aMn_2G_bO_4$ (where $0.90\leq a\leq1.8$, and $0.001\leq b\leq0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0\leq f\leq2$); $Li_{(3-f)}Fe_2(PO_4)_3$ ($0\leq f\leq2$); and $LiFePO_4$.

In the above formulae: A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

A compound having a coating layer added on the surface thereof and a mixture of the compound and the compound having the coating layer added thereto may also be used. The coating layer may include a coating element compound such as an oxide or a hydroxide of the coating element, an oxyhydroxide of the coating element, an oxycarbonate of the coating element, and a hydroxy carbonate of the coating element. The compound forming such a coating layer may be amorphous or crystalline. Examples of the coating element included in the coating layer may include Mg, Al, Co, K, Na, Ca, Si, Ti, V, Sn, Ge, Ga, B, As, Zr, and mixtures thereof. Any suitable coating method may be used as a coating layer forming process as long as coating may be performed using a method that does not adversely affect the physical properties of the positive active material (for example, spray coating and/or dipping), and further description thereof is not necessary here because further details of the coating method would be readily recognizable to one skilled in the art.

For example, the positive active material may include $LiNiO_2$, $LiCoO_2$, $LiMn_xO_{2x}$(x=1, 2), $LiNi_{1-x}Mn_xO_2$ (0<x<1), $LiNi_{1-x-y}Co_xMn_yO_2$ (0<x≤0.2, 0<y≤0.2), $LiNi_{1-x-y}Co_xAl_yO_2$ (0<x≤0.2, 0<y≤0.2), $LiFePO_4$, $V_2O_5$, TiS, MoS, and/or the like.

For example, the positive active material may include a lithium transition metal oxide having a layered rock salt type structure. For example, the positive active material may include may include a ternary lithium transition metal oxide expressed as $LiNi_xCo_yAl_zO_2$ (NCA) (where 0<x<1, 0<y<1, 0<z<1, x+y+z=1), $LiNi_xCo_yMn_zO_2$ (NCM) (where 0<x<1, 0<y<1, 0<z<1, and x+y+z=1), $LiNi_xCo_yAl_vMn_wO_2$ (NCAM) (where 0<x<1, 0<y<1, 0<v<1, 0<w<1, and x+y+v+w=1), $LiNi_aCo_bAl_cO_2$ (0.6≤a<1, 0<b<0.5, 0<c<0.5, a+b+c=1), $LiNi_aCo_bMn_cO_2$ (where 0.6≤a<1, 0<b<0.5, 0<c<0.5, a+b+c=1), or $LiNi_aCo_bAl_dMn_eO_2$ (0.6≤a<1, 0<b<0.5, 0<d<0.5, 0<e<0.5, a+b+d+e=1).

The same conductive material, binder, and solvent as those in the above-described negative active material composition may be used in a positive active material composition. In some cases, a plasticizer may be additionally added to the positive active material composition and/or the negative active material composition to enable the formation of pores in electrode plates.

Amounts of the positive active material, the conductive material, the binder, and the solvent may be in the ranges generally used in the manufacture of a lithium battery in the art. One or more of the conductive material, the binder, and the solvent may be omitted according to the use and configuration of the lithium battery.

In one or more embodiments, the binder used for the positive electrode may be the same as a binder included in the coating layer of the separator.

Next, the composite separator is located between the positive electrode and the negative electrode.

The composite separator may be separately prepared and located between the positive electrode and the negative electrode. In an embodiment, the composite separator may be prepared by a formation process including: winding an electrode assembly including a positive electrode/separator/negative electrode in a jelly roll shape; placing the jelly roll in a battery case or a pouch; thermally softening and pre-charging the jelly roll under pressure in the battery case or the pouch; hot rolling the charged jelly roll; cold rolling the charged jelly roll; and charging and discharging the charged jelly roll under pressure.

Next, an electrolyte is prepared.

The electrolyte may be in a liquid or gel state.

The electrolyte may include, for example, an organic electrolytic solution. The electrolyte may be a solid. Examples of the solid electrolyte include, but are not limited to, boron oxides, and lithium oxynitrides, and any suitable inorganic solid electrolyte that is used as a solid electrolyte in the art may be used. The solid electrolyte may be formed on the negative electrode by, for example, sputtering. The solid electrolyte may include, for example, a sulfide-based solid electrolyte or an oxide-based solid electrolyte.

For example, an organic electrolytic solution may be prepared. The organic electrolytic solution may be prepared by dissolving a lithium salt in an organic solvent.

As the organic solvent, any suitable material available as an organic solvent in the art may be used. The organic solvent may include, for example, propylenecarbonate, ethylenecarbonate, fluoroethylenecarbonate, butylenecarbonate, dimethylcarbonate, diethylcarbonate, methylethylcarbonate, methylpropylcarbonate, ethylpropylcarbonate, methylisopropylcarbonate, dipropylcarbonate, dibutylcarbonate, benzonitrile, acetonitrile, tetrahydrofuran, 2-methyltetrahydrofuran, γ-butyrolactone, dioxorane, 4-methyldioxorane, N,N-dimethylformamide, dimethylacetamide, dimethylsulfoxide, dioxane, 1,2-dimethoxyethane, sulfolane, dichloroethane, chlorobenzene, nitrobenzene, diethyleneglycol, dimethylether, and mixtures thereof.

The lithium salt may also include any suitable material available as a lithium salt in the art. For example, the lithium salt may include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$(where x and y are natural numbers of 1 to 10, respectively), LiCl, LiI, or a mixture thereof.

Figure 2:
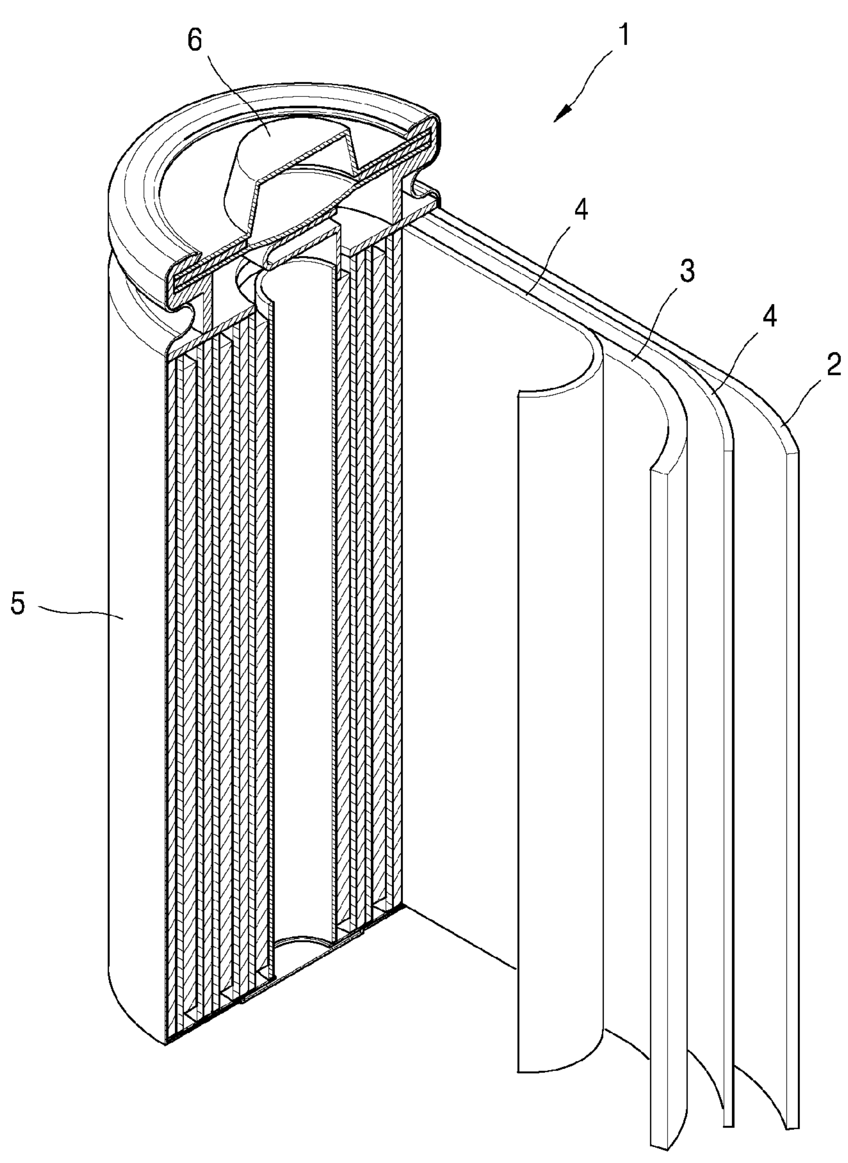
FIG. 2 is a schematic diagram of a lithium battery according to an embodiment.

As shown in FIG. 2, a lithium battery 1 includes a positive electrode 3, a negative electrode 2, and a separator 4. The positive electrode 3, the negative electrode 2, and the separator 4 are wound or folded into a cylindrical jelly-roll type (or kind) of electrode assembly and then placed in a battery case 5. Subsequently, an organic electrolytic solution is injected into the battery case 5 and sealed with a cap assembly 6 to complete the manufacture of the lithium battery 1. The battery case 5 may be a cylindrical type (or kind), a rectangular type (or kind), or a thin-film type (or kind). The lithium battery 1 may be a lithium ion battery.

The lithium battery 1 may be a lithium polymer battery. For example, the positive electrode, the negative electrode, and the separator are wound or folded into a flat jelly-roll type (or kind) of electrode assembly and then placed in a pouch. Then, an organic electrolytic solution is injected into a pouch and sealed to complete the manufacture of the lithium battery. In one or more embodiments, the positive electrode, the negative electrode, and the separator are sequentially stacked as a flat electrode assembly and then placed in a pouch. Then, an organic electrolytic solution is injected into the pouch and sealed to complete the manufacture of the lithium battery.

Because the lithium battery has excellent high-rate characteristics and lifetime characteristics, the lithium battery is suitable for an electric vehicle (EV). For example, the lithium battery is suitable for a hybrid vehicle such as a plug-in hybrid electric vehicle (PHEV).

A plurality of lithium batteries may be stacked to form a battery module, and a plurality of the battery modules may form a battery pack. Such a battery pack may be used in any suitable device requiring high capacity and high output. For example, the battery pack may be used in a notebook, a smartphone, an electric vehicle, and/or the like.

In an embodiment, the battery module includes a plurality of batteries and a frame holding the batteries. The battery pack may include, for example, a plurality of battery modules and bus bars connecting or coupling the battery modules. The battery module and/or the battery pack may further include a cooling device.

A plurality of battery packs may be controlled by a battery management system. A battery management system includes a battery pack and a battery control device connected or coupled to the battery pack.

Another aspect of embodiments of the present disclosure provides a method of manufacturing a composite separator, the method including: providing a porous substrate; preparing a stacked structure by coating a composition including a water-soluble binder, inorganic particles, and water, which is used as a solvent, on one surface or opposite surfaces of the porous substrate; and drying the stacked structure to form a coating layer on at least one surface of the porous substrate, wherein the coating layer includes a water-soluble binder and inorganic particles, the water-soluble binder includes a polyacrylic acid metal salt, a weight average molecular weight of the polyacrylic acid metal salt is about 300,000 Dalton or more, and an average particle diameter (D50) of the inorganic particles is about 500 nm or more.

A porous substrate is provided. The porous substrate is the same as described in connection with the porous substrate of the composite separator described above.

A composition including a water-soluble binder, inorganic particles, and water is prepared. An aqueous binder composition is prepared by mixing the water-soluble binder, the inorganic particles, and water, and then stirring and/or dispersing the mixture. The solvent of the aqueous binder composition may further include water or another solvent miscible with water. Other solvents that are miscible with water include, for example, alcohols such as ethanol.

The amount of the water-soluble binder may be, for example, from about 0.1 parts by weight to about 30 parts by weight, from about 0.1 parts by weight to about 20 parts by weight, from about 0.1 parts by weight to about 10 parts by weight, or from about 0.1 parts by weight to about 5 parts by weight, based on 100 parts by weight of the composition.

The amount of the inorganic particle may be, for example, from about 1 part by weight to about 30 parts by weight, from about 1 part by weight to about 20 parts by weight, or from about 1 part by weight to about 10 parts by weight, based on 100 parts by weight of the composition.

The composition may further include a wetting agent. The amount of the wetting agent may be, for example, from about 0.01 parts by weight to about 3 parts by weight, from about 0.01 parts by weight to about 2 parts by weight, from about 0.01 parts by weight to about 1 part by weight, or from about 0.01 to about 0.5 parts by weight, based on 100 parts by weight of the composition.

The amount of the solvent may be, for example, from about 70 parts by weight to about 99.9 parts by weight, from about 80 parts by weight to about 99.9 parts by weight, or from about 90 parts by weight to about 99.9 parts by weight, based on 100 parts by weight of the composition.

The composition may further include any other suitable additives used in the art according to desired physical properties.

The water-soluble binder may include a polyacrylic acid metal salt, and the polyacrylic acid metal salt may have a weight average molecular weight of about 300,000 Dalton or more, and the inorganic particles may have an average particle diameter (D50) of about 500 nm or more. The water-soluble binder and the inorganic particles may be understood by referring to the water-soluble binder and the inorganic particles included in the composite separator described above.

Then, a composition including a water-soluble binder, inorganic particles, and water is coated on one surface or opposite surfaces of the porous substrate to prepare a stacked structure. A method of applying the composition is not particularly limited, and any suitable method generally used in the art may be used. For example, the coating method may include flow coating, roll coating, dip coating, bar coating, etc. A thickness of the coated composition is not particularly limited, and may be determined within a range that satisfies a thickness of the coating layer required or desired for the composite separator.

Then, the prepared stacked structure is dried, and a coating layer is on at least one surface of the porous substrate to manufacture a composite separator. The drying condition is not particularly limited, and for example, may be dried at 60° C. for 1 hour, but is not limited thereto. The drying temperature may be, for example, 25° C. to 200° C., and the drying time may be 5 minutes to 24 hours. Referring to FIG. 1, coating layers 12 and 13 may be on opposite surfaces of the porous substrate 11, or may be on one surface of the porous substrate 11.

Hereinafter, embodiments of the present disclosure will be described in more detail through Examples and Comparative Examples. However, the Examples are provided to illustrate embodiments of the present disclosure, and the scope of the present disclosure is not limited thereto.

Preparation of Composite Separator

Example 1: PAA Li 10% substitution (polyacrylic acid lithium salt in which 10% of the acrylic acid repeating units have an acidic hydrogen of an acrylic acid group that is substituted with lithium), Mw=345K (the polyacrylic acid lithium salt had a molecular weight of 345,000 Dalton), 0.7 μm inorganic particles, total coating layer thickness of 2 μm A polyethylene porous substrate (Cangzhou mingzhu (CZMZ), China, NW0835) having a thickness of 8 μm was prepared.

Boehmite (BG601, Anhui Estone Materials & Technology Co., Ltd.) having an average particle diameter (D50) of 0.7 μm, which is inorganic particles, a salt obtained by substituting the end of polyacrylic acid (weight average molecular weight Mw=345,000 Daltons), e.g., a polyacrylic acid lithium salt, which is a water-soluble binder, polyvinyl alcohol (PVA, Daejung Chemicals & Metals Co., Ltd., Mw=22, 000 Dalton), which is a wetting agent, and distilled water were mixed at a weight ratio of 9.52:0.33:0.14:90.01, and then stirred to prepare an aqueous composition.

The acrylic repeating unit substituted with lithium ions in the acrylic repeating unit included in the polyacrylic acid lithium salt has a mole ratio of 0.1. For example, the amount of the lithium acrylate repeating unit in the total repeating unit (e.g., the sum of the acrylic acid repeating unit and the lithium acrylate repeating unit) included in the polyacrylic acid lithium salt was 10 mol %.

The prepared aqueous compositions were coated on each of opposite surfaces of a porous substrate, followed by drying at 60° C. for 1 hour to form a coating layer having a thickness of 1 μm on each of the opposite surfaces of the porous substrate, thereby completing the manufacture of a composite separator. The total thickness of the coating layer was 2 μm.

The total thickness of the composite separator was 10 μm.

Example 2: PAA Li 30% substitution (polyacrylic acid lithium salt in which 30% of the acrylic acid repeating units have an acidic hydrogen of an acrylic acid group that is substituted with lithium), Mw=345K (the polyacrylic acid lithium salt had a molecular weight of 345,000 Dalton), 0.7 μm inorganic particles, total coating layer thickness of 2 μm A composite separator was prepared in substantially the same manner as in Example 1, except that the ratio of the acrylic repeating unit substituted with lithium ions in the acrylic repeating unit included in the polyacrylic acid lithium salt was changed to be 0.3.

30 mol % of the acrylic repeating unit included in the polyacrylic acid lithium salt was substituted with lithium ions.

Example 3: PAA Li 70% substitution (polyacrylic acid lithium salt in which 70% of the acrylic acid repeating units have an acidic hydrogen of an acrylic acid group that is substituted with lithium), Mw=345K (the polyacrylic acid lithium salt had a molecular weight of 345,000 Dalton), 0.7 μm inorganic particles, total coating layer thickness of 2 μm A composite separator was prepared in substantially the same manner as in Example 1, except that the ratio of the acrylic repeating unit substituted with lithium ions in the acrylic repeating unit included in the polyacrylic acid lithium salt was changed to be 0.7.

70 mol % of the acrylic repeating unit included in the polyacrylic acid lithium salt was substituted with lithium ions.

Example 4: PAA Li 80% substitution (polyacrylic acid lithium salt in which 80% of the acrylic acid repeating units have an acidic hydrogen of an acrylic acid group that is substituted with lithium), Mw=345K (the polyacrylic acid lithium salt had a molecular weight of 345,000 Dalton), 0.7 μm inorganic particles, total coating layer thickness of 2 μm A composite separator was prepared in substantially the same manner as in Example 1, except that the ratio of the acrylic repeating unit substituted with lithium ions in the acrylic repeating unit included in the polyacrylic acid lithium salt was changed to be 0.8.

80 mol % of the acrylic repeating unit included in the polyacrylic acid lithium salt was substituted with lithium ions.

Example 5: PAA Li 100% substitution (polyacrylic acid lithium salt in which 100% of the acrylic acid repeating units have an acidic hydrogen of an acrylic acid group that is substituted with lithium), Mw=345K (the polyacrylic acid lithium salt had a molecular weight of 345,000 Dalton), 0.7 μm inorganic particles, total coating layer thickness of 2 μm A composite separator was prepared in substantially the same manner as in Example 1, except that a ratio of an acrylic acid repeating unit substituted with lithium ions in an acrylic acid repeating unit included in a polyacrylic acid lithium salt was changed to 1.0.

100 mol % of the acrylic repeating unit included in the polyacrylic acid lithium salt was substituted with lithium ions.

Comparative Example 1: PAA Li 0% substitution (polyacrylic acid in which none of the acrylic acid repeating units have an acidic hydrogen of an acrylic acid group that is substituted with lithium), Mw=345K (the polyacrylic acid had a molecular weight of 345,000 Dalton), 0.7 μm inorganic particles, total coating layer thickness of 2 μm A composite separator was prepared in substantially the same manner as in Example 1, except that lithium unsubstituted polyacrylic acid (weight average molecular weight Mw=345, 000 Dalton) was used instead of the lithium polyacrylate salt.

Comparative Example 2: CMC (carboxy methyl cellulose), 0.5 μm inorganic particles, 2 μm of total coating layer thickness A composite separator was prepared in substantially the same manner as in Example 1, except that sodium carboxymethyl cellulose (CMC, carboxy methyl cellulose, medium viscosity, Sigma-Aldrich, C4888) was used instead of the polyacrylic acid lithium salt.

Comparative Example 3: CMC, 0.5 μm inorganic particles, 3 μm of total coating layer thickness A composite separator was prepared in substantially the same manner as in Example 1, except that sodium carboxymethyl cellulose (CMC, carboxy methyl cellulose, medium viscosity, Sigma-Aldrich, C4888) was used instead of the polyacrylic acid lithium salt, and the thickness of the coating layer was changed to be 1.5 μm.

As such, a composite separator in which a coating layer having a thickness of 1.5 μm was on each of opposite surfaces of a porous substrate, was prepared. The total thickness of the composite separator was 11 μm.

Comparative Example 4: PAA Li 70% substitution (polyacrylic acid lithium salt in which 70% of the acrylic acid repeating units have an acidic hydrogen of an acrylic acid group that is substituted with lithium), Mw=250K (the polyacrylic acid lithium salt had a molecular weight of 250,000 Dalton), 0.7 μm inorganic particles, 2 μm of total coating layer thickness A composite separator was prepared in substantially the same manner as in Example 1, except that a salt obtained by substituting the end of polyacrylic acid having a weight average molecular weight of Mw=250,000 Dalton with lithium ions, that is, a polyacrylic acid lithium salt, is used, and a ratio of an acrylic acid repeating unit substituted with lithium ions in an acrylic acid repeating unit included in a polyacrylic acid lithium salt was changed to be 0.7.

Comparative Example 5: PAA Li 70% substitution (polyacrylic acid lithium salt in which 70% of the acrylic acid repeating units have an acidic hydrogen of an acrylic acid group that is substituted with lithium), Mw=345K (the polyacrylic acid lithium salt had a molecular weight of 345,000 Dalton), 0.3 μm inorganic particles, 2 μm of total coating layer thickness A composite separator was prepared in substantially the same manner as in Example 1, except that the ratio of the acrylic acid repeating unit substituted with lithium ions in the acrylic acid repeating unit included in the polyacrylic acid lithium salt is changed to be 0.7, and Boehmite having an average particle diameter (D50) of 0.3 μm was used as inorganic particles.

70 mol % of the acrylic repeating unit in the acrylic repeating unit included in the polyacrylic acid lithium salt was substituted with lithium ions.

Evaluation Example 1: Evaluation of Heat Shrinkage Rate

The separators prepared according to Examples 1 to 5 and Comparative Examples 1 to 5 were left in a convection oven at 150° C. for 1 hour, and then taken out, cooled at room temperature, and the heat shrinkage rate thereof was measured.

The shrinkage rate of the separator was evaluated in such a manner that a linear marker having a length of 10 cm was drawn in each of a machine direction (MD) and a transverse direction (TD) of the separator, and the separator was left in an oven and then taken out thereof, followed by cooling at room temperature, and the degree of shrinkage of each of the markers was calculated using Equation 3.

$$\text{Shrinkage rate}=[(\text{initial marker length}-\text{reduced marker length})/\text{initial marker length}]\times 100 \qquad \text{Equation 3}$$

The heat shrinkage rate measurement results are shown in Table 1.

Evaluation Example 2: Substrate Adhesion Force (Peel Strength) Test of Composite Separator Regarding the composite separators prepared in Examples 1 to 5 and Comparative Examples 1 to 5, peel strength between the porous substrate and the porous layer was measured to evaluate adhesion force therebetween.

The adhesion force between the porous substrate and the porous layer was measured by performing a 180° peel test (INSTRON).

In one or more embodiments, the composite separators prepared according to Examples 1 to 5 and Comparative Examples 1 to 5 were attached to the slide glass by using a double-sided tape and uniformly compressed by a hand roller.

A peel strength, which is a force applied when moving by 30 mm while peeling at a tensile speed of 20 mm/min in a 180° direction in an adhesion force measuring device, was measured, and the results are shown in Table 1.

Evaluation Example 3: Moisture Content of Composite Separator

Moisture contents of the composite separators prepared according to Examples 1 to 5 and Comparative Examples 1 to 5 were measured.

The composite separator was stored in an oven at a temperature of 85° C. for 12 hours and then removed to measure the moisture content thereof.

The moisture content of the composite separator was measured using a Karl Fischer coulometry moisture analyzer (831 KF Coulometer, Metrohm, Switzerland), and the results are shown in Table 1 below.

TABLE 1

| | Machine direction (MD) Shrinkage rate [%] | Transverse direction (TD) Shrinkage rate [%] | Substrate adhesion force [gf/mm] | Moisture content [ppm] |
|---|---|---|---|---|
| Example 1 | 10 | 10 | 14 | 567 |
| Example 2 | 3 | 2 | 18 | 580 |
| Example 3 | 2 | 1 | 21 | 599 |
| Example 4 | 2 | 2 | 20 | 741 |
| Example 5 | 3 | 1 | 19 | 980 |
| Comparative Example 1 | 21 | 19 | 11 | 530 |
| Comparative Example 2 | ≥30 | ≥30 | 5 | 650 |
| Comparative Example 3 | 4 | 5 | 7 | 810 |
| Comparative Example 4 | ≥20 | ≥20 | 8 | 640 |
| Comparative Example 5 | 1 | 1 | 20 | 1360 |

As shown in Table 1, the composite separators of Examples 1-5 exhibited a heat shrinkage rate of 10% or less, a substrate adhesion force of 10 gf/mm or greater, and a moisture content of less than 1000 ppm.

In addition, the composite separators of Examples 2 to 4 exhibited a heat shrinkage rate of 3% or less, a substrate adhesion force of 10 gf/mm or more, and a moisture content of less than 600 ppm, thereby exhibiting further improved physical properties as compared to Examples 1 and 5.

On the other hand, the composite separators of Comparative Examples 1, 2, and 4 had a heat shrinkage rate of 20% or more, and thus, heat resistance thereof was reduced.

The composite separator according to Comparative Example 3 showed improved heat resistance due to an increase in the thickness of the coating layer, but had a substrate adhesion force of 7 gf/mm or less, which was still unsatisfactory.

The composite separator of Comparative Example 5 had improved heat resistance and adhesion force to a substrate, but had an excessively increased moisture amount of 1360 ppm.

According to one aspect of embodiments, due to the features of the molecular weight of a water-soluble binder and the average particle diameter of inorganic particles included in a coating layer, a composite separator including the coating layer has a reduced volume, improved thermal stability, and enhanced adhesion force.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims, and equivalents thereof.

What is claimed is:

1. A composite separator comprising:

a porous substrate; and a coating layer on at least one surface of the porous substrate, wherein the coating layer comprises a water-soluble binder and inorganic particles, the water-soluble binder comprises a polyacrylic acid metal salt, the polyacrylic acid metal salt has a weight average molecular weight of 300,000 Dalton to 500,000 Dalton, and the inorganic particles have an average particle diameter (D50) of about 500 nm or more, wherein the polyacrylic acid metal salt comprises a polyacrylic acid lithium salt, wherein the polyacrylic acid metal salt comprises an acrylic acid repeating unit substituted with lithium ions and an acrylic acid repeating unit, and a mole ratio of the acrylic acid repeating unit substituted with lithium ions to the acrylic acid repeating unit included the polyacrylic acid metal salt is from 0.3 to about 0.9.

2. The composite separator of claim 1, wherein the weight average molecular weight of the polyacrylic acid metal salt is about 300,000 Dalton to about 450,000 Dalton.

3. The composite separator of claim 1, wherein the coating layer comprises 0.5 parts by weight to 30 parts by weight of the water-soluble binder based on 100 parts by weight of the inorganic particles.

4. The composite separator of claim 1, wherein the average particle diameter (D50) of the inorganic particles is about 500 nm to about 1000 nm.

5. The composite separator of claim 1, wherein the inorganic particles comprise at least one selected from $TiO_2$, $SnO_2$, CaO, ZnO, $ZrO_2$, $CeO_2$, NiO, MgO, $Al_2O_3$, $SiO_2$, $Y_2O_3$, $SrTiO_3$, $BaTiO_3$, $MgF_2$, $Mg(OH)_2$, barium sulfate, and boehmite.

6. The composite separator of claim 1, wherein a total thickness of the coating layer is 25% or less of a total thickness of the composite separator.

7. The composite separator of claim 1, wherein a thickness of the coating layer on one surface of the porous substrate is 1.2 μm or less, and a total thickness of the composite separator is 10.5 μm or less.

8. The composite separator of claim 1, wherein the coating layer has a peel strength of about 10 gf/mm to about 30 gf/mm with respect to the porous substrate.

9. The composite separator of claim 1, wherein the porous substrate has a pore size of about 0.01 μm to about 2 μm.

10. The composite separator of claim 1, wherein the porous substrate has a porosity of about 5% to about 95%.

11. The composite separator of claim 1, wherein the porous substrate comprises one or more selected from polyethylene, polypropylene terephthalate, polyethylene terephthalate, polybutylene terephthalate, polyester, polyacetal, polyamide, polycarbonate, polyimide, polyether ether ketone, polyethersulfone, polyphenylene oxide, polyphenylene sulfide, and polyethylene naphthalate.

12. The composite separator of claim 1, wherein when treated at 150° C. for 1 hour, the composite separator has a machine direction shrinkage rate and a transverse direction shrinkage rate, each being 3% or less.

13. The composite separator of claim 1, wherein the composite separator has a moisture content of about 1 ppm and about 990 ppm when treated at 85° C. for 12 hours.

14. The composite separator of claim 1, wherein the coating layer further comprises a wetting agent.

15. The composite separator of claim 14, wherein the wetting agent has a weight average molecular weight of about 250 Dalton to about 30,000 Dalton.

16. The composite separator according to claim 14, wherein the wetting agent comprises one or more selected from polyvinyl alcohol, polyethylene glycol, sodium dodecyl sulfate, sodium dibutylnaphthalenesulfonate, polyacrylamide, polyethylene glycol fatty acid ester, alkyl polyoxyethylene ether carboxylate, alkyl phenol polyoxyethylene ether, sodium alkylbenzenesulfonate, alkyl phenol polyoxyethylene ether, polyoxyethylene alkyl amine, and polyoxyethylene amide.

17. A lithium battery comprising:
- a positive electrode; a negative electrode; and
- the composite separator of claim 1 between the positive electrode and the negative electrode.

18. A method of manufacturing a composite separator of claim 1, the method comprising:
- providing the porous substrate;
- preparing a stacked structure by coating a composition comprising the water-soluble binder, the inorganic particles, and water on one surface or opposite surfaces of the porous substrate; and
- drying the stacked structure to form the coating layer on the at least one surface of the porous substrate,
- wherein the coating layer comprises the water-soluble binder and the inorganic particles, and the water-soluble binder comprises the polyacrylic acid metal salt, and
- the weight average molecular weight of the polyacrylic acid metal salt is about 300,000 Dalton to 450,000 Dalton, and the average particle diameter (D50) of the inorganic particles is about 500 nm or more.

* * * * *